(12) United States Patent
Padiyar et al.

(10) Patent No.: US 8,439,396 B2
(45) Date of Patent: May 14, 2013

(54) AIRBAG MODULE

(75) Inventors: Prabhakar M. Padiyar, Rochester Hills, MI (US); Steve Moon, Swartz Creek, MI (US); Jonathan McDonnell, Berkley, MI (US); Richard Bryan Cox, Marysville, OH (US); David L. Guyton, Fenton, MI (US); Nicholas S. Penchoff, Troy, MI (US)

(73) Assignee: TK Holdings Inc., Auburn Hills, MI (US)

( * ) Notice: Subject to any disclaimer, the term of this patent is extended or adjusted under 35 U.S.C. 154(b) by 113 days.

(21) Appl. No.: 12/914,817

(22) Filed: Oct. 28, 2010

(65) Prior Publication Data

US 2011/0101657 A1 May 5, 2011

Related U.S. Application Data

(60) Provisional application No. 61/257,278, filed on Nov. 2, 2009.

(51) Int. Cl.
*B60R 21/16* (2006.01)

(52) U.S. Cl.
USPC ...................................................... 280/730.2

(58) Field of Classification Search ............... 280/728.2, 280/730.1, 730.2, 743.1
See application file for complete search history.

(56) References Cited

U.S. PATENT DOCUMENTS

| | | | | |
|---|---|---|---|---|
| 5,393,092 A * | 2/1995 | Charns et al. | ............... | 280/743.1 |
| 5,921,576 A * | 7/1999 | Sinnhuber | .................. | 280/730.2 |
| 5,971,427 A * | 10/1999 | Whited et al. | ............. | 280/730.2 |
| 6,103,984 A * | 8/2000 | Bowers et al. | ............. | 280/730.2 |
| 6,199,896 B1 * | 3/2001 | Brucker | ...................... | 280/728.2 |
| 6,209,907 B1 * | 4/2001 | Fischer | ...................... | 280/728.3 |
| 6,220,623 B1 * | 4/2001 | Yokota | ....................... | 280/728.2 |
| 6,340,169 B1 * | 1/2002 | Tietze | ......................... | 280/728.2 |
| 6,382,663 B1 * | 5/2002 | Tietze | ......................... | 280/730.2 |
| 6,447,005 B2 * | 9/2002 | Alb et al. | .................. | 280/730.2 |
| 6,517,102 B2 * | 2/2003 | Kolb | .......................... | 280/728.3 |
| 6,644,686 B2 * | 11/2003 | Saelzle | ....................... | 280/728.3 |
| 6,736,421 B2 * | 5/2004 | Blake et al. | ................ | 280/730.2 |
| 6,902,187 B2 * | 6/2005 | Sonnenberg | ............... | 280/730.2 |
| 6,923,471 B2 * | 8/2005 | Salzle | ........................ | 280/728.2 |
| 2007/0090630 A1 * | 4/2007 | Wilmot | ...................... | 280/728.2 |
| 2009/0278336 A1 * | 11/2009 | Minamikawa | ............. | 280/728.2 |

* cited by examiner

*Primary Examiner* — Eric Culbreth
*Assistant Examiner* — Robert A Coker
(74) *Attorney, Agent, or Firm* — Foley & Lardner LLP (57) ABSTRACT

An airbag module for protecting an occupant of a vehicle comprising an inflatable curtain airbag configured to deploy between an occupant and an interior side of the vehicle; an inflator for providing inflation gas for the airbag; a housing configured to surround the airbag; and a strap configured to retain the airbag in the housing prior to inflation and deployment of the airbag; wherein at least one end of the strap is connected to the housing.

20 Claims, 7 Drawing Sheets

AIRBAG MODULE

CROSS-REFERENCE TO RELATED PATENT APPLICATIONS

This application claims priority to and the benefits of U.S. Provisional Patent Application No. 61/257,278, filed on Nov. 2, 2009. The forgoing provisional application is incorporated by reference herein in its entirety.

BACKGROUND

The present application relates generally to the field of airbag modules for motor vehicles. More specifically, this disclosure relates to a side-curtain type airbag modules configured to be more durable for improved transportation and vehicle installation.

SUMMARY

One embodiment of the invention relates to an airbag module for protecting an occupant of a vehicle comprising an inflatable curtain airbag configured to deploy between an occupant and an interior side of the vehicle; an inflator for providing inflation gas for the airbag; a housing configured to surround the airbag; and a strap configured to retain the airbag in the housing prior to inflation and deployment of the airbag; wherein at least one end of the strap is connected to the housing.

The housing may include a catch member with an opening through which the at least one end of the strap passes; wherein the catch member includes an engaging portion that abuts a corresponding engaging portion located on the strap to thereby lock the strap in position parallel to a wall of the housing. The other end of the strap may be integrally connected to the housing.

The housing may include a pair of openings, each of the openings being located on opposite sides of the housing, and wherein the at least one end of the strap passes through one of the openings and the other end of the strap passes through the other opening, and wherein each of the ends of the straps includes a projection that engages a wall of the housing after the strap is inserted through the opening to prevent the ends of the straps from being withdrawn from the openings to thereby lock the strap in position relative to the housing.

Each end of the strap may be split into two portions each portion passing through an opening in a wall of the housing, and wherein each portion includes a projection that engages the wall of the housing to prevent the portion of the strap from being withdrawn from the opening to thereby lock the strap in position relative to the housing.

The strap may include two ends and a separation mechanism located between the two ends that is configured to separate the two ends of the strap during deployment of the inflatable curtain airbag. The separation mechanism may be configured as a V-shaped notch orientated transverse to the longitudinal length of the strap. The housing may include a retaining member configured to engage an opening in the strap, and wherein following the separation of the two ends of the strap the end of the strap with the opening is retained by the retaining member.

The airbag module may further comprise a plurality of straps with each strap configured to retain a portion the airbag in the housing prior to inflation and deployment of the airbag; wherein at least one end of each strap is connected to the housing. Each strap of the plurality of straps may include a separation mechanism; wherein the separation mechanism of one strap of the plurality of straps is configured to separate at a different separation force than the separation force of at least one other strap of the plurality of straps.

Another embodiment of the invention relates to a housing for use in an airbag module having an inflatable airbag cushion configured to deploy between an occupant and an interior portion of the vehicle to protect the occupant. The housing comprises a thin walled base; two thin walled legs extending away from the base and forming a cavity configured to receive the stored airbag cushion such that the housing substantially surrounds the airbag cushion; and a strap configured to retain the airbag cushion in the housing prior to inflation and deployment of the airbag; wherein at least one end of the strap is connected to the housing. The housing may further comprise a catch member with an opening through which the at least one end of the strap passes; wherein the catch member includes an engaging portion that abuts a corresponding engaging portion located on the strap to thereby lock the strap in position parallel to one of the thin walls of the housing. The other end of the strap may be integrally connected to the housing.

The housing may further comprise a pair of openings, each of the openings being located on two different thin walls of the housing, and wherein the at least one end of the strap passes through one of the openings and the other end of the strap passes through the other opening, and wherein each of the ends of the straps includes a projection that engages one of the thin walls of the housing after the strap is inserted through the opening to prevent the ends of the straps from being withdrawn from the openings to thereby lock the strap in position relative to the housing.

Each end of the strap may be split into two portions each portion passing through an opening in one of the thin walls of the housing, and wherein each portion includes a projection that engages the wall of the housing to prevent the portion of the strap from being withdrawn from the opening to thereby lock the strap in position relative to the housing. The strap may include two ends and a separation mechanism located between the two ends that is configured to separate the two ends of the strap during deployment of the inflatable airbag cushion. The separation mechanism may be configured as a V-shaped notch orientated transverse to the longitudinal length of the strap.

The housing may further comprise a retaining member extending from one of the thin walls of the housing and configured to engage an opening in the strap, and wherein following the separation of the two ends of the strap the end of the strap with the opening is retained by the retaining member. The retaining member may be configured to engage an opening in the strap, and wherein during deployment of the inflatable curtain airbag the end of the strap with the opening is retained by the retaining member.

DETAILED DESCRIPTION

Side-curtain airbags (SCABs) are located in vehicles to help protect occupants from injury during a dynamic vehicle impact or rollover event. A side-curtain airbag module or system may include an airbag cushion, which deploys during a dynamic vehicle side-impact event or rollover event, whereby inflation gas is rapidly pushed into the inflatable cushion of the airbag system. A SCAB module may further include an inflator, which may use a pyrotechnic device to generate the inflation gas almost instantaneously and push the gas at a high volumetric flow rate into the inflatable cushion of the airbag system. A side curtain cushion or airbag is generally stored within and deployed from the roof-rail of a vehicle, which is the portion of the vehicle located between the door frame and roof. SCAB cushions are typically packaged through a process of folding, rolling, or a combination of folding and rolling to compact the airbag to be able to fit into the small cross-section of the vehicle roof-rail. After installation, the airbag module may be stored behind a roof-liner or head-liner to provide improved interior vehicle appearance or aesthetics. SCABs may be used to provide protection to occupants located in any seating row (e.g., first, second, third) of any vehicle and typically provide protection to outboard occupants when deployed. Often, a single side-curtain airbag is configured with one or more than one inflatable portion to provide protection to multiple occupants, located in different seating rows.

Figure 4:
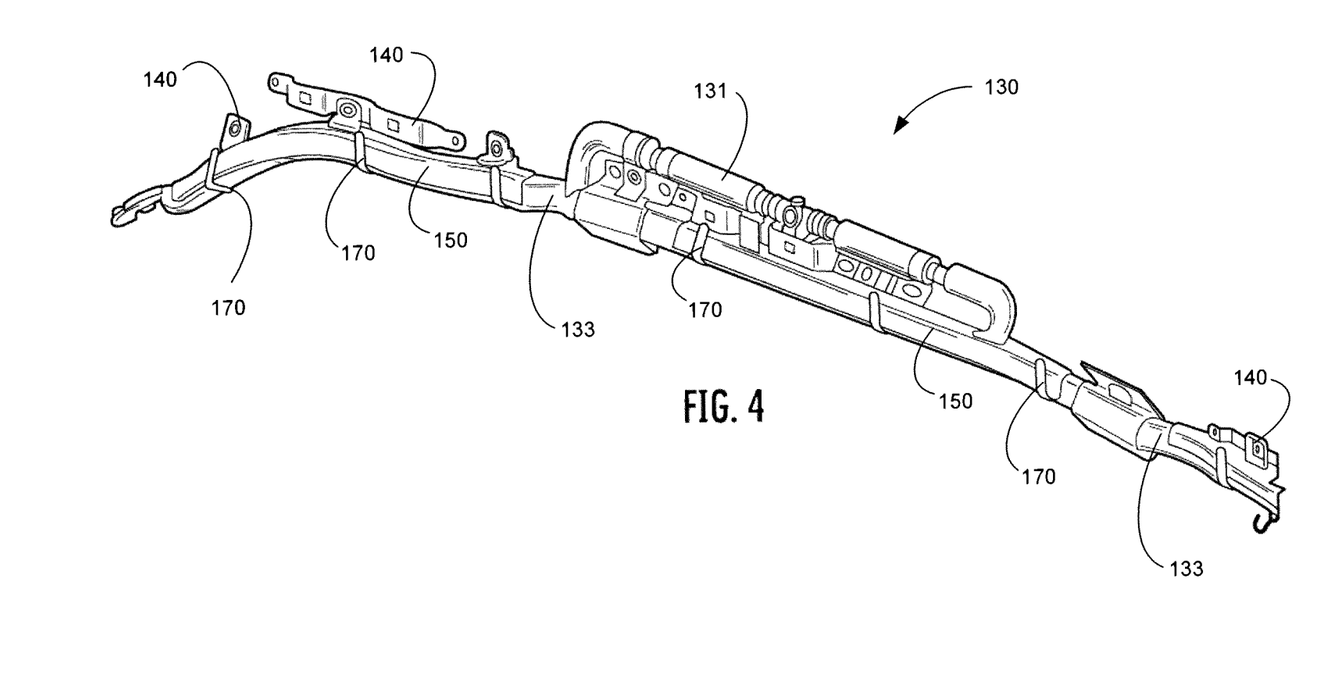
FIG. 4 is a perspective view of an exemplary embodiment of a side-curtain airbag module shown stored and ready for installation into a vehicle, such as the vehicle of FIG. 1.

Side-curtain airbags are typically installed in the roof-rail of the vehicle in a folded configuration, such as illustrated in FIG. 4, to provide easier installation into the relative small volume (or cross-section) of the roof-rail. SCAB modules may include one or a plurality of protective members (or housings) to prevent the airbag cushion from being damaged, for example, by burrs on the sheet metal components that form the structural support of the roof-rail assembly. SCAB modules may further include one or more mounting mechanisms, which may be coupled on a first side (or first end) to the airbag module, preferably to the housing, and may be coupled on a second side (or second end) to the vehicle, such as the roof-rail.

Figure 1:
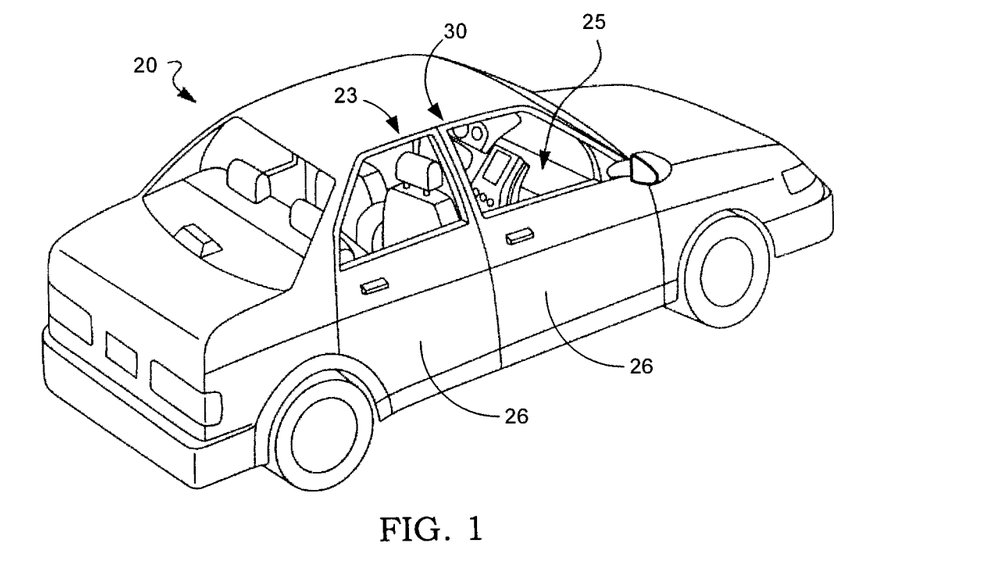
FIG. 1 is a perspective view of a motor vehicle illustrating an exemplary embodiment of a side-curtain airbag shown stored within the roof-rail of the vehicle prior to deployment.

With reference to FIG. 1, an exemplary embodiment of a motor vehicle 20 is illustrated and includes an interior passenger compartment 25. The passenger compartment 25 may include a side-curtain airbag (SCAB) module 30, which may be stored within and deployed from, for example, the roof-rail 23 of the vehicle 20. The SCAB module 30 may provide occupant protection in the form of occupant restraint to at least one occupant during airbag deployment. According to an exemplary embodiment, the SCAB module 30 is configured to provide restraint to at least one occupant located on the passenger-side of the vehicle 20, during an airbag deploying event. According to another exemplary embodiment, the SCAB module is configured to provide restraint to at least one occupant located on the driver-side of the vehicle 20, during an airbag deploying event. Those skilled in the art will recognize that the airbag modules disclosed herein can be included within any vehicle configured to include an occupant and may be used to restrain and/or protect any occupant (e.g., driver, front passenger, rear passenger). It should be noted that the airbag modules disclosed and illustrated herein are not meant as limitations.

Figure 2:
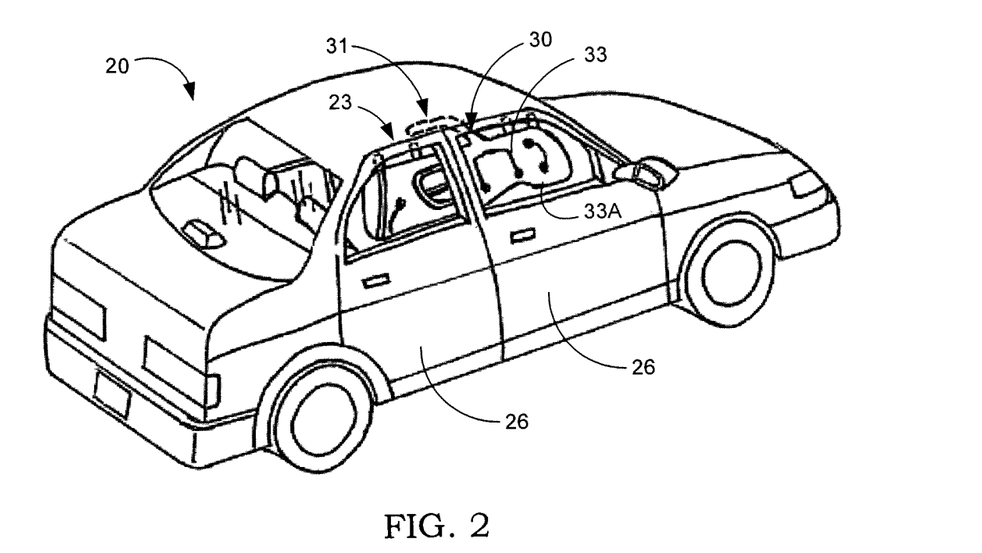
FIG. 2 is a perspective view of the motor vehicle of FIG. 1 illustrating an exemplary embodiment of a side-curtain airbag shown unfolded or deployed to restrain a vehicle occupant.

With reference to FIG. 2, the motor vehicle 20 is illustrated with the SCAB module 30 in the deployed or inflated configuration, triggered by a dynamic vehicle impact event, such as a rollover or side-impact event. According to an exemplary embodiment, the deployed SCAB module 30 provides restraint and/or protection to the front and rear occupants located on the passenger-side of the vehicle 20 by substantially preventing the occupants from contacting the interior of the door assemblies 26 located on the passenger-side of the vehicle 20 or from contacting other vehicle components with a relative high force created by a relative high acceleration of the occupants induced by the sudden deceleration of the vehicle 20. According to another exemplary embodiment, the vehicle 20 includes two SCAB modules stored within the passenger-side roof-rail 23, wherein the first SCAB module is configured to deploy to restrain and/or protect the front occupant located on the passenger-side of vehicle 20 and the second SCAB module is configured to deploy to restrain and/or protect the rear occupant located on the passenger-side of vehicle 20.

According to an exemplary embodiment, SCAB module 30 includes an inflatable airbag cushion 33, which upon being triggered to deploy, breaches the roof-rail 23 (in which it is stored in) due to high internal pressure induced by inflation gas being generated by an inflator 31 and pushed into the airbag cushion. The airbag cushion 33 inflates and deploys with the leading edge of the deployment 33A of the airbag cushion moving away from the roof-rail 23, inflator 31, and trailing edge of deployment (i.e., edge fixed to roof-rail by mounting mechanisms) of the cushion in a direction substantially downward and along the interior surface of the door assembly 26. According to an exemplary embodiment, the final deployed location of the airbag cushion 33 is positioned between the door assembly 26 and the occupant (not shown).

Figure 3:
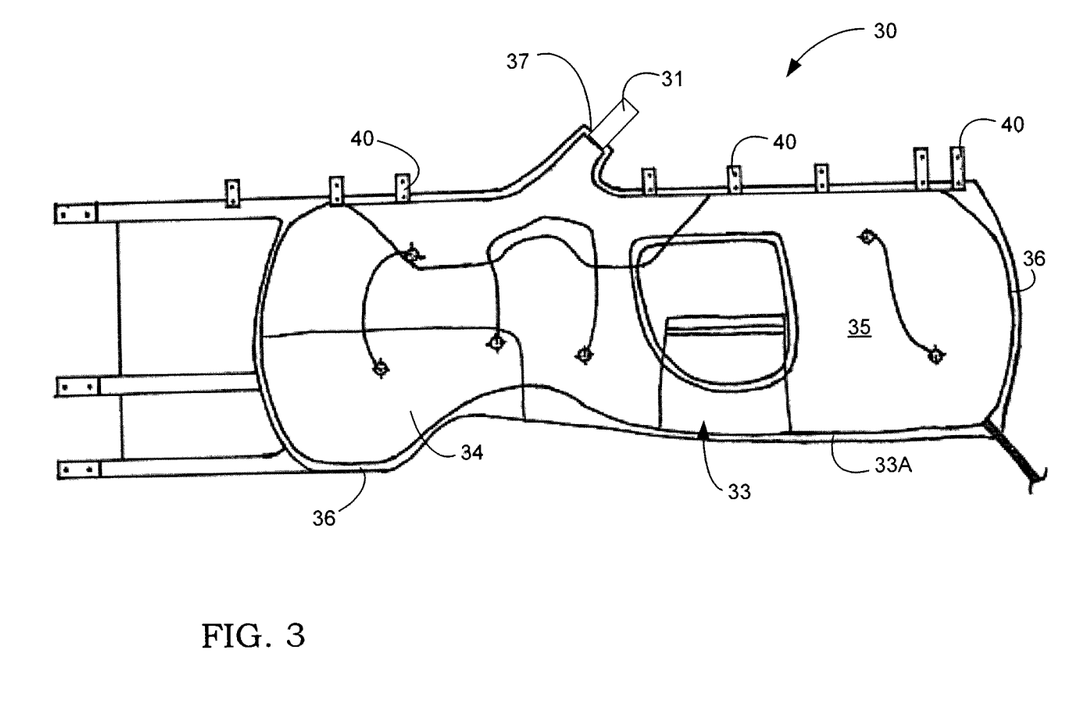
FIG. 3 is a side view of an exemplary embodiment of a side-curtain airbag module having an airbag cushion shown in the flat prior to folding and rolling.

With reference to FIG. 3, an exemplary embodiment of a SCAB module 30 is illustrated, and includes an inflatable airbag cushion 33 (shown in the flat prior to folding and/or rolling), an inflator 31 to provide inflation gas to inflate the cushion 33, and a plurality of mounting mechanisms 40. The inflator 31 may be made using any known or future developed methods, and may include any device, such as a pyrotechnic device, for producing inflation gas to inflate the airbag cushion 33. The plurality of mounting mechanisms 40 couple the SCAB module 30 to the vehicle 20, and may be configured using any suitably known or future methods. According to an exemplary embodiment, the mounting mechanism 40 is configured as a formed steel bracket that includes a first end to couple to the SCAB module 30 (e.g., the airbag cushion 33) and a second end to couple to the roof-rail 23 of vehicle 20, wherein the second end includes an aperture configured to receive a fastener.

The airbag cushion 33 may be formed from one or more airbag panels 34 coupled through conventional methods (e.g., stitching) at seams 36 to form at least one inflatable chamber 35 configured to receive inflation gas from the inflator during airbag deployment. The airbag panels 34 forming the airbag cushion 33 may be made from conventional high strength material (e.g., woven nylon fabric) or from any suitable material. The airbag panels 34 forming the airbag cushion 33 may be coated with a sealant (e.g., silicone) to prohibit the escape of inflation gas, during deployment, through the porosity of the airbag panels. According to an exemplary embodiment, the airbag cushion is configured to form two inflatable chambers, so that during deployment, the first inflatable chamber provides restraint and/or protection to a first occupant (e.g., front-row passenger) and the second inflatable chamber provides restraint and/or protection to a second occupant (e.g., a second-row passenger).

Figure 5:
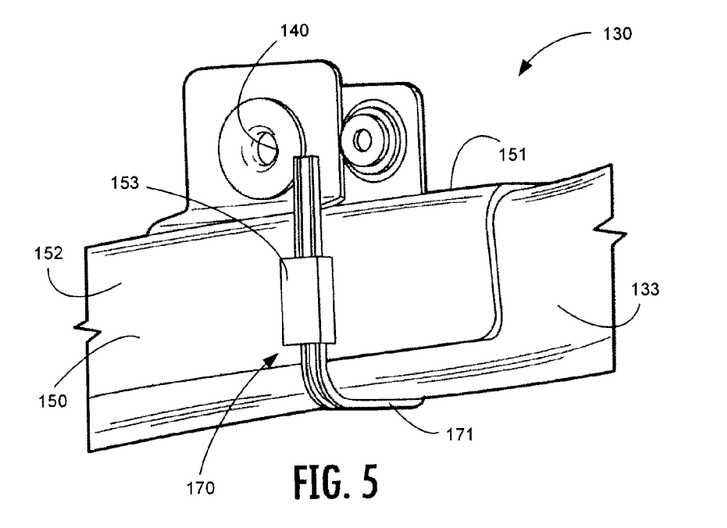
FIG. 5 is a perspective view of an exemplary embodiment of a retention mechanism for a side-curtain airbag module, such as the side-curtain airbag module of FIG. 4.

With reference to FIGS. 4 and 5, an exemplary embodiment of a SCAB module 130 is illustrated in the stored configuration and ready for installation into a vehicle, such as the vehicle 20. According to an exemplary embodiment, the SCAB module 130 includes an inflator 131, an airbag cushion 133, a plurality of protective members (or housings) 150, a plurality of mounting mechanisms 140, and a plurality of tie mechanisms (or retention mechanisms) 170. According to another exemplary embodiment, the SCAB module includes an airbag cushion, at least one housing (or protective member), and at least one retention (or tie) mechanism. The airbag cushion 133 may be manipulated into the stored configuration through a process of folding, rolling, or a combination of rolling and folding. It should be noted that the SCAB modules disclosed herein may be configured to include any number of cushions, any number of housings, and any number of retention mechanisms, and the embodiments shown herein are not meant as limitations.

According to an exemplary embodiment, the housing 150 is made from a polymer (e.g., polypropylene, ethylene-propylene added to polypropylene) through an injection molding process, having a substantially C-shaped cross section formed by two relative thin walled legs 152 extending away from a relative thin walled base 151. According to an exemplary embodiment, the legs 152 extend in a substantially perpendicular direction away from the base. According to other exemplary embodiments, housings may be made from any suitable material by any suitable process having any suitable cross-section that provides protection to the airbag cushion when stored. The housing 150 may include one or more than one catch member 153 configured to lock or retain the retention mechanism 170 in place.

According to an exemplary embodiment, the retention mechanism 170 is configured as a strap 171 that is to be received and retained by the catch member 153 of the housing 150. The retention mechanism 170 is configured to retain a portion of the stored (e.g., folded and/or rolled) airbag cushion 133 within a portion of housing 150 prior to inflation and deployment of the airbag. According to an exemplary embodiment, the retention mechanism 170 is further configured to release (or tear or separate) when subjected to a predetermined tension induced by the deploying airbag cushion 133 in order to allow the airbag cushion 133 to deploy properly in an unimpeded manner. The predetermined tension force that the retention mechanism is configured to release at may be tailored to meet varying customer requirements.

The SCAB module having a plurality of retention mechanisms, may be configured so that the release or separation tension of the individual retention mechanisms may be the same or different relative to the other retention mechanisms of the SCAB module. For example, the airbag cushion of the SCAB module may be configured so that the portions of the cushion nearest the inflator have an internal pressure that is greater than the internal pressure within the portions of the cushion farthest from the inflator at any given time during airbag deployment, whereby the retention mechanisms located along the cushion nearest the inflator may be configured to release at a higher tension relative to the release tension of the retention mechanisms located along the cushion farthest from the inflator, in order to time the release of both the near and far (relative to the inflator) retention mechanisms substantially simultaneously. According to an exemplary embodiment, the SCAB module includes two housings with one housing configured on each side of an inflator, and six retention mechanisms with three retention mechanisms located along the length of each housing. The retention mechanisms located nearest the inflator are configured to have relative high release tensions, the retention mechanisms located farthest the inflator are configured to have relative low release tensions, and the two retention mechanisms located between the nearest and farthest retention mechanisms are configured to have relative intermediate release tensions.

The retention mechanisms disclosed herein provide a durable and reliable method for retaining the stored airbag cushion within the SCAB module during assembly, transportation (e.g., shipment from assembly location to installation location), and installation into the vehicle, while providing a repeatable and controlled release or separation force, so as not to delay or impede deployment of the airbag cushion.

Figure 6A:
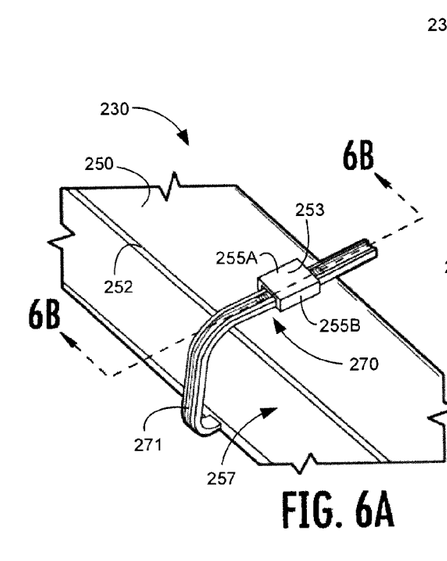
FIG. 6A is a perspective view of another exemplary embodiment of a retention mechanism for a side-curtain airbag module shown coupled to a housing.
Figure 6B:
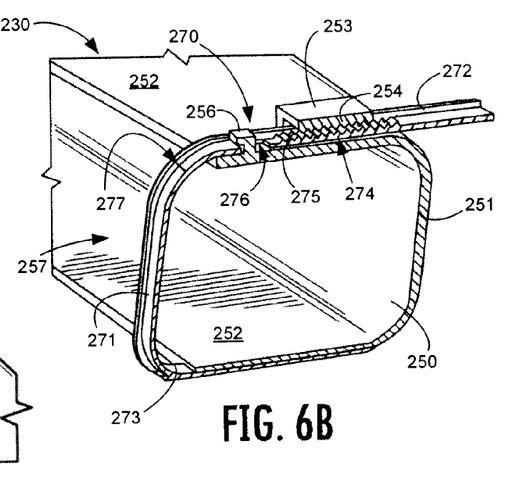
FIG. 6B is a sectional perspective view of the retention mechanism of FIG. 6A.
Figure 7A:
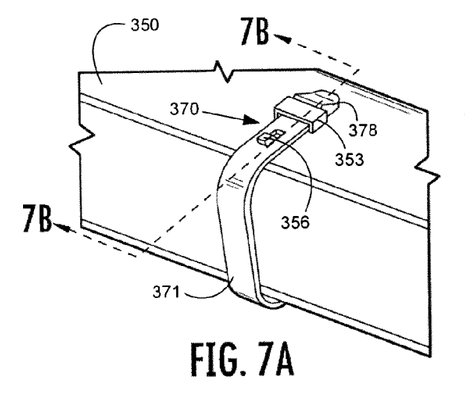
FIG. 7A is a perspective view of another exemplary embodiment of a retention mechanism for a side-curtain airbag module shown coupled to a housing.
Figure 7B:
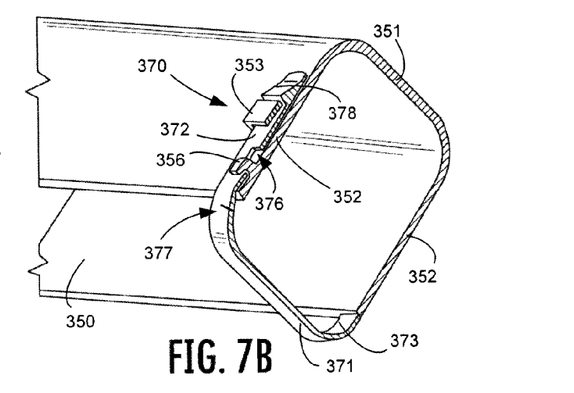
FIG. 7B is a sectional perspective view of the retention mechanism of FIG. 7A.
Figure 8A:
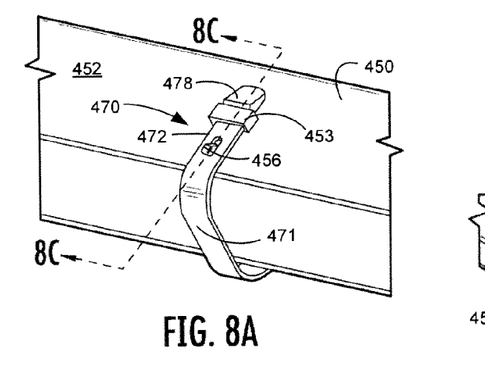
FIG. 8A is a perspective view of another exemplary embodiment of a retention mechanism for a side-curtain airbag module shown coupled to a housing.
Figure 8B:
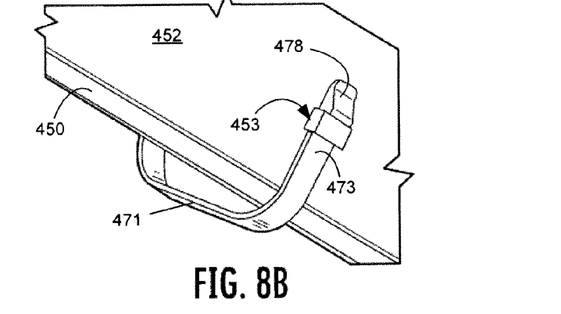
FIG. 8B is another perspective view of the retention mechanism of FIG. 8A.
Figure 8C:
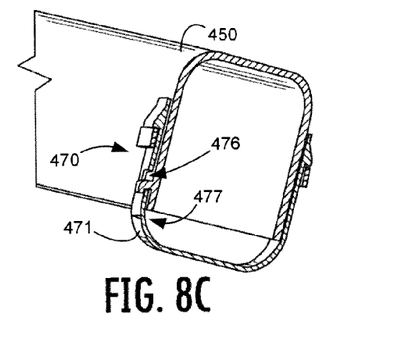
FIG. 8C is a sectional perspective view of the retention mechanism of FIG. 8A.

With reference to FIGS. 6A and 6B, a portion of another exemplary embodiment of a SCAB module 230 is illustrated, and includes an airbag cushion (not shown for clarity), a housing 250, and a retention mechanism 270. The retention mechanism 270 is shown coupled to a housing 250 to retain a portion of an airbag cushion (not shown) prior to inflation and deployment of the airbag.

According to an exemplary embodiment, the retention mechanism 270 includes a flexible strap 271 having a first end 272 and a second end 273. The flexible strap 271 may be made of a polymer (e.g., polypropylene, ethylene-propylene added to polypropylene) or any suitable material, manufactured through any suitable process (e.g., injection molding). According to an exemplary embodiment, the second end 273 of the strap 271 extends from and is integrally formed with a first leg 252 of the housing 250. The first end 272 of the strap 271 may extend longitudinally away from the second end 273 when in the free position (i.e., when the first end 272 is not coupled to the housing 250 or the catch member 253 of the housing 250 to retain the cushion within the housing). According to another exemplary embodiment, the second end 273 of the strap 271 is formed separate to and then coupled to the first leg 252 of the housing 250 using any method disclosed herein, as well as using any suitable conventional or future known methods.

The retention mechanism 270 may further include an engaging portion (or adjustable member) 274 configured to have adjustable engagement. According to an exemplary embodiment, the engaging portion 274 includes a series of adjacent and substantially similarly shaped teeth 275, whereby two adjacent teeth 275 form a notch which is configured to engage a corresponding engaging portion (or lock member) 254 of the catch member 253 in order to engage and retain the first end 272 of strap 271. According to an exemplary embodiment, the engaging portion 274 is integrally formed with the first end 272 of the strap 271. According to another exemplary embodiment, the engaging portion 274 is formed separate to and then coupled to the first end 272 of the strap 271 using any suitable conventional or future known methods.

A flexible strap 271 of the retention mechanism 270 may further include an opening (or aperture) 276 configured to receive a retaining (or retention) member 256 of the housing 250. According to an exemplary embodiment, the opening 276 is rectangular shaped and configured to be larger than the retaining member 256 of the housing 250, in order to allow the retaining member 256 to engage the opening 276. The slot length of opening 276 may vary and may be lengthened or shortened to accommodate desired adjustability between the engaging portion 274 of the strap 271 and the engaging portion 254 of the catch member 253. The opening 276 may be configured to allow the retaining member 256 to retain the first end 272 of the strap 271 after release or tearing of the retention mechanism 270 to prohibit the strap 271 or a portion of the strap 271 do not become projectiles during airbag deployment.

According to an exemplary embodiment, the retention mechanism 270 is configured to release during airbag deployment, so that airbag cushion is no longer retained by the retention mechanism 270, which allows the airbag cushion to deploy outside of the housing 250 without impediment or delay. For example, the teeth 275 of the engaging portion 274 of the strap 271 or the engaging portion 254 of the catch member 253 may be configured to shear or break at a predetermined stress/strain to allow the first end 272 of the strap 271 to become decoupled from the catch member 253.

According to another exemplary embodiment, the retention mechanism 270 includes a separation (or break or tear) mechanism 277 that is configured to tear or separate during airbag deployment when the tension in the retention mechanism 270 reaches a predetermined tension threshold. Thus, the separation mechanism is configured to separate the strap into two or more portions, whereby the airbag cushion may inflate and deploy outside of the housing in a manner that is unimpeded and not delayed by the retention mechanism 270.

According to an exemplary embodiment, the separation mechanism 277 is V-shaped notch orientated transverse to the longitudinal length of the strap 271. The V-shaped separation mechanism 277 may be provided at any location along the longitudinal length of the strap between the second end 273 and the portion of the strap 271 that is retained by the catch member 253. The depth and width of the notch formed by the V-shaped separation mechanism 277 into the strap 271 may be varied to adjust the threshold tension at which the separation mechanism 277 of the retention mechanism separates the strap 271. According to an exemplary embodiment, the depth of the notch may be at any distance that is less than the full width of the strap.

According to other embodiments, the separation mechanism 277 may be configured to form any suitable shape (e.g., semi-circle, U-shaped, slot, slit), and may extend any distance less than or equal to the full width of the strap 271 or the retention mechanism 270. The separation mechanism configured as a stress-riser provides a controlled and repeatable tension at which separation occurs, as well as a consistent location of separation, which prevents the separation mechanism from delaying or impeding the deployment of the airbag.

According to an exemplary embodiment, the housing 250 has a substantially C-shaped cross section formed by two relative thin walled legs 252 extending away from a relative thin walled base 251 to form an open cavity 257. The legs 252 may extend substantially perpendicular from the base 251. The open cavity 257 is configured to receive the stored airbag cushion (not shown), so that the legs 252 and base 251 enclose at least a portion of the cushion. The intersection between the legs 252 and the base 251 may include a radius or other transition feature. The housing 250 may extend at any length, which is tailored to the length of the airbag cushion (not shown) that the housing 250 encloses when the cushion is in the stored configuration. The housing 250 may extend in a linear or substantially linear direction or may vary extend at a non-linear length.

According to an exemplary embodiment, the housing 250 further includes a catch member 253 configured to retain a portion of the retention mechanism 270 in place. According to an exemplary embodiment, the catch member 253 includes a top portion 255A substantially parallel to and offset from the adjacent leg 252 of the housing 250, and two walls 255B that are substantially parallel to each other and substantially perpendicular to the top portion 255A (and adjacent leg). The two walls 255B of the catch member 253 may extend from the leg 252 of the housing 250 to the top portion 255A of the catch member 253, forming substantially an opening (or lumen or tunnel) configured to receive the first end 272 of the strap 271. According to an exemplary embodiment, the size of the opening formed between the catch member 253 and the leg 252 of the housing 250 is desirably configured to be slightly larger than the cross-section of the portion of the strap 271 that is to pass through the opening. Thus, the two walls 255B of the catch member 253 may be separated (i.e., offset) by a distance at least equal to the width of the strap 271, and the top portion 255A of the catch member 253 may be offset from the leg of the housing 250 by a distance at least equal to the thickness of the strap 271.

According to an exemplary embodiment, the bottom surface of the top portion 255A of the catch member 253 includes a engaging portion 254, which protrudes towards the leg 252 of the housing 250. According to an exemplary embodiment, the engaging portion 254 is formed to include a cross-sectional shape that substantially matches the engaging portion 274 of the retention mechanism 270. For example, the engaging portion 254 of the catch member 253 may be teeth configured to selectively couple the engaging portion 274 of the retention mechanism 270, where the matching teeth of the engaging portion 254 may be wider or narrower than the width of the teeth 275 of the engaging portion 274 of the retention mechanism 270.

The engaging portion 254 of the catch member 253 retains the strap 271 in place by locking the engaging portion 274 of the strap 271 until a predetermined force is applied in the longitudinal direction of the strap 271, which allows the teeth 275 of the engaging portion 274 of the strap 271 and/or the engaging portion 254 of the catch member 253 to elastically displace or deform enough to allow the engaging portion 274 of the strap 271 and the first end 272 of the strap 271 to move in a direction transverse to the engaging portion 254 of the catch member 253. Those skilled in the art will recognize that the shape of the engaging portion 274 of the strap 271 and the shape of the engaging portion 254 of the catch member 253 may be varied to vary the force required to allow movement of the engaging portion 274 of the strap 271 (and hence allow movement of the strap 271 as well) relative to the catch member 253 (and hence the housing 250). According to an exemplary embodiment, the force required is low enough to be applied manually by hand during assembly, but is high enough to hold the weight of the airbag cushion in place.

According to an exemplary embodiment, the housing 250 further includes a retaining member 256 to engage the opening (or aperture) 276 in the strap 271 to retain the first end 272 of the strap when separated from the second end 273, through tearing of the separation mechanism 277. Thus, the first end 272 of the strap 271 being retained by the retaining member 256 further prohibits the likelihood of the first end 272 of the strap 271 from becoming a projectile during airbag deployment. According to an exemplary embodiment, the retaining member 256 is an L-shaped protrusion, where the base of the L is offset and substantially parallel to the leg 252 of the housing 250, as shown in FIG. 6B. According to other exemplary embodiments, the retaining member 256 may form any suitable shape (e.g., cylinder, rectangular protrusion, etc.) that may aid in retaining the first end 272 or second end 273 of the strap 271 after separation of the strap 271.

During assembly of the SCAB module 230, the airbag cushion (not shown) may be folded, rolled, or a combination of rolled and folded into a small cross section, which may fit between the legs 252 and base 251 of the housings 250 for storage prior to inflation and deployment of the airbag. Once the folded cushion is stored between the legs 252 and base 251 of the housing, the first end 272 of the strap 271 may be placed into the opening (or lumen) formed by the catch member 253 and the leg 252 of the housing 250, whereby a force applied to the strap 271 may slide the first end 272 of the strap 271 into one end of the opening and out the other end of the opening until the teeth 275 of the engaging portion 274 engage the engaging portion 254, thereby holding and retaining the strap 271 in position. Application of additional force may further slide the strap 271 relative to the engaging portion 254 of the catch member 253. The first end 272 of the strap 271 may be slide until the strap 271 is taunt to the housing 250 and/or to the airbag cushion. The strap 271 retains the folded airbag cushion between the legs 252 and base 251 of the housing 250 during further assembly, shipping, and installation of the SCAB module 230 into the vehicle roof-rail.

During deployment of the airbag cushion of the SCAB module 230, the inflator forces the inflation gas into the cushion chamber, expanding the cushion in a direction substantially away from the base of the housing, which imparts a tension force in the strap 271. When the tension in the strap 271 reaches a predetermined force, the separation mechanism 277 releases (or tears or breaks), separating the first end 272 from the second end 273 of the strap 271, thereby permitting the airbag cushion to continue to deploy unimpeded and without delay.

With reference to FIGS. 7A thru 8C, other exemplary embodiments of retention mechanisms 370, 470 are shown coupled to housings 350, 450. According to the exemplary embodiment shown in FIGS. 7A and 7B, the retention mechanism 370 includes a flexible strap 371 having a first end 372 configured to selectively engage (i.e., capable of being coupled and decoupled as needed) a catch member 353 located on a first leg 352 of the housing 350, and a second end 373 integrally formed with and extending from a second leg 352 of the housing 350. The first end 372 of the strap 371 extends longitudinally away from the second end 373, however, since the strap 371 is flexible the orientation of the first end 372 relative to the second end 373 may be changed, such as when the first end 372 selectively engages the catch member 353. According to the exemplary embodiment shown in FIGS. 8A thru 8C, the retention mechanism 470 includes a flexible strap 471 having a first end 472 configured to selectively engage a catch member 453 located on a first leg 452 of the housing 450, and a second end 473 configured to selectively engage a catch member 453 located on a second leg 452 of the housing 450.

According to another exemplary embodiment, the free ends 372, 472, 473 of the straps 371, 471 are configured to be locked into engagement with corresponding catch members 353, 453, in order for the straps 371, 471 to retain the airbag cushions (not shown). For example, the first end 372 includes a projection (or lock member) 378 configured to engage the catch member 353. According to an exemplary embodiment, the projection 378 forms a ramp (or wedge) shape, which may create an interference fit with the catch member 353 by having a ramp height greater than the height of the opening formed by the catch member 353 and leg 352 of the housing 350. The ramp of the projection 378 easily allows the first end 372 of the strap to be slid through the opening of the catch member 353, elastically displacing (or deforming) the projection 378 and/or the catch member 353, until the ramp of the projection 378 completely extends beyond the catch member 353, whereby the projection 378 and/or catch member 353 return to the original (i.e., non-deformed or non-displaced) shape. This results in the projection 378 of the strap 371 being retained by the catch member 353. For example, behind the ramp of the projection 378 may be a flat surface configured to be substantially parallel to the abutting surface of the catch member 353, whereby the catch member 353 prohibits the projection 378 from passing back through the opening formed by the catch member 353 and leg 352 of the housing 350.

The flexible straps 371, 471 may further include a separation (or break or tear) mechanism 377, 477, as described herein, which may be configured to separate the first end 372, 472 from the second end 373, 473 of the strap 371, 471, during deployment of the airbag cushion. The straps 371, 471 may further include an opening (or aperture) 376, 476 for engaging a retaining (or retention) member 356, 456 of the housings 350, 450, configured as disclosed herein.

Figures 9A, 9B:
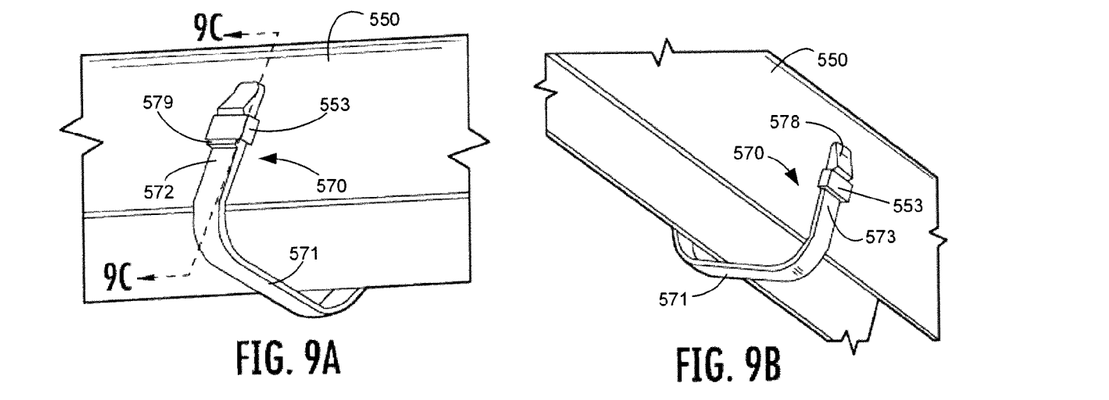
FIG. 9A is a perspective view of another exemplary embodiment of a retention mechanism for a side-curtain airbag module shown coupled to a housing.
FIG. 9B is another perspective view of the retention mechanism of FIG. 9A.
Figures 9C, 10A, 10B:
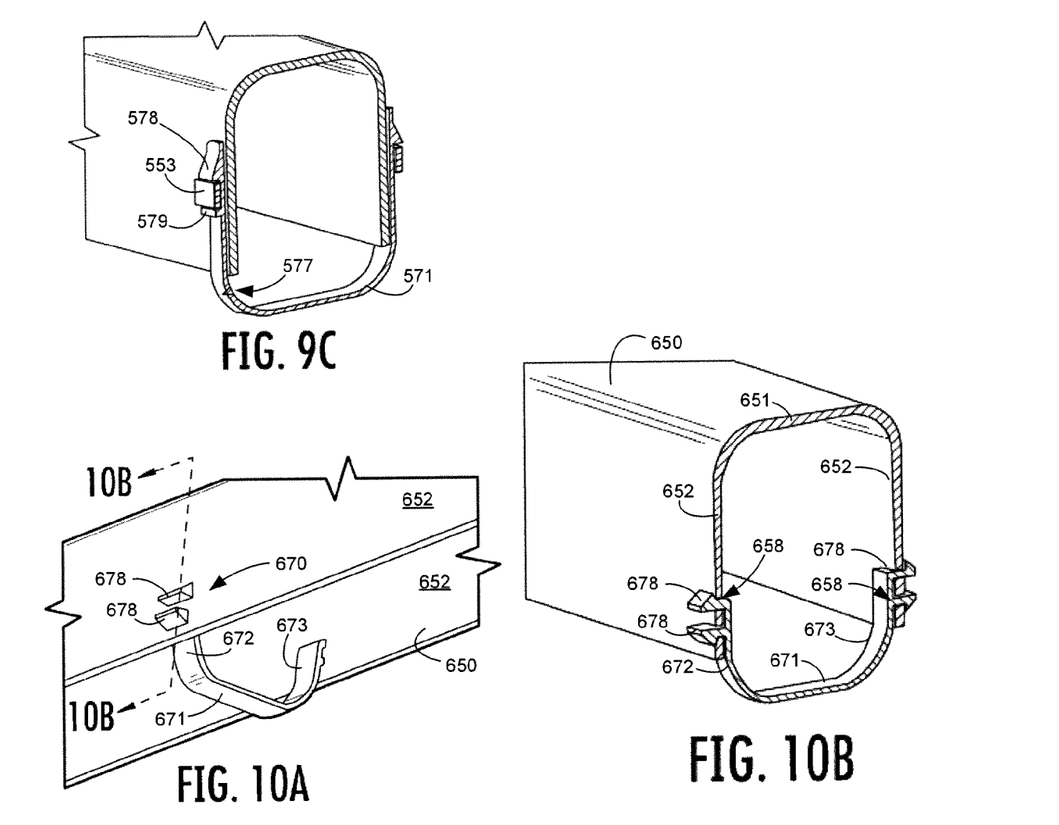
FIG. 9C is a sectional perspective view of the retention mechanism of FIG. 9A.
FIG. 10A is a perspective view of another exemplary embodiment of a retention mechanism for a side-curtain airbag module shown coupled to a housing.
FIG. 10B is another perspective view of the retention mechanism of FIG. 10A.
Figure 11A:
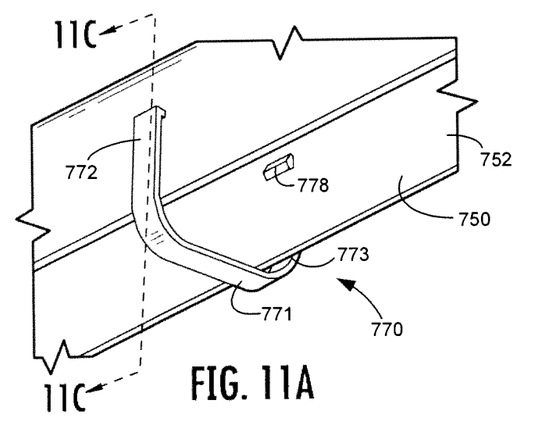
FIG. 11A is a perspective view of another exemplary embodiment of a retention mechanism for a side-curtain airbag module shown coupled to a housing.
Figure 11B:
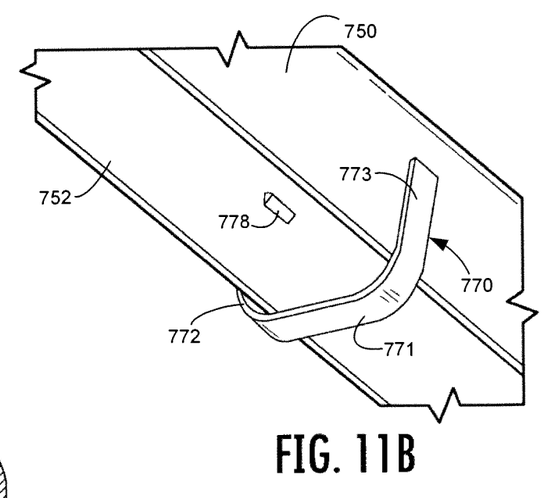
FIG. 11B is another perspective view of the retention mechanism of FIG. 11A.
Figure 11C:
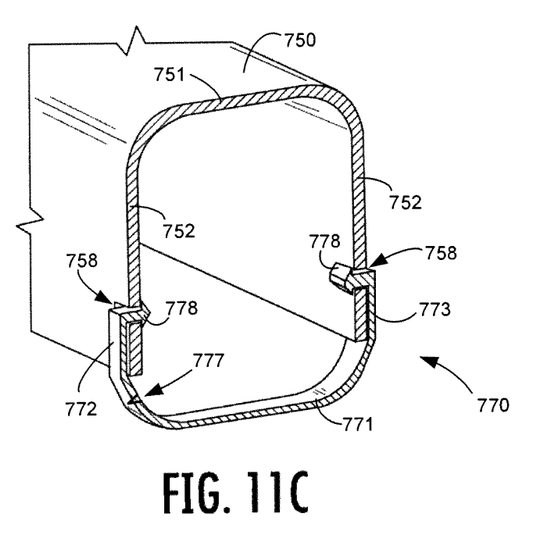
FIG. 11C is a sectional perspective view of the retention mechanism of FIG. 11A.

With reference to FIGS. 9A thru 9C, another exemplary embodiment of a retention mechanism 570 is shown coupled to a housing 550 to retain an airbag cushion (not shown). The retention mechanism 570 may include a flexible strap 571 having a first end 572 and a second end 573. According to an exemplary embodiment, the second end 573 of the strap 571 extends from one leg of the housing 550 and is integrally formed with the housing 550, whereby the first end 572 of the strap 571 may extend longitudinally away from the second end 573. According to another exemplary embodiment, the first and second ends 572, 573 of the strap 571 include projections 578, whereby the projections 578 are configured to detachably or selectively couple to catch members 553 formed (e.g., integrally formed) on the outside surfaces of legs of the housing 550.

According to an exemplary embodiment, the first end 572 of the strap 571 further includes a stop member 579 to lock the first end 572 of the strap 571 to the catch member 553 of the housing 550. According to an exemplary embodiment, the stop member 579 is offset a distance from the end of the ramp (that is adjacent to the catch member 553) substantially the same distance as the width of the catch member 553. The stop member may be offset at varying distances, such as greater than the width of the catch member. According to an exemplary embodiment, the stop member 579 is configured as a rectangular shaped extrusion that runs and extends transverse to the longitudinal direction of the strap 571. The stop member 579 provides improved retention of the first end 572 of the strap 571 when separated from the second end 573 of the strap 571. The flexible straps may further include break or tear mechanisms, as described herein, which may be configured to separate the first end from the second end of the strap, during deployment of the airbag cushion.

With reference to FIGS. 10A thru 11C, other exemplary embodiments of retention (or tie) mechanisms 670, 770 are shown coupled to housings (or protective members) 650, 750 configured having substantially C-shaped cross-sections with two legs 652, 752 extending from a base 651, 751. The retention mechanisms 670, 770 include flexible straps 671, 771 having first ends 672, 772 and second ends 673, 773. The first ends 672, 772, and second ends 673. 773 may be configured to include a projection (or locking member) 678, 778 to engage the housings 650, 750, such that the ends of the retention mechanisms 670, 770 are retained by the housings 650, 750.

According to an exemplary embodiment, the first and second ends 672, 673 of the strap 671 are split into two portions each portion passing through an opening 658 in the wall 652 of the housing 650. According to an exemplary embodiment, each portion of the strap 671 includes a projection 678 that engages the wall 652 of the housing 650 to prevent the portion of the strap 671 from being withdrawn from the opening 658 to thereby lock the strap 671 in position relative to the housing 650. According to another exemplary embodiment, the first and second ends 772, 773 of the strap 771 include one projection 778, whereby each projection 778 engages a corresponding opening 758 in one of the legs 752 of the housing 750. Retention mechanisms may be configured to include a strap having any number of locking members on one or more than one end of the strap, whereby each locking member may be configured to engage a corresponding opening or aperture in the housing.

According to an exemplary embodiment, the projection 678 of the two portions of the retention mechanism 670 extends substantially perpendicular from the end of the strap, whereby the projection includes a ramp extending from one side of the projection at an oblique angle. According to another exemplary embodiment, the projection 778 of retention mechanism 770 extends substantially perpendicular from the end of the strap, whereby the projection includes a ramp extending on two sides of the projection at oblique angles. The ramp may be offset from the end of the strap a distance substantially equal to or greater than the thickness of the portion (e.g., leg) of the housing in which the projection engages. The projections may be compliant and resilient to elastically deform during insertion of the projection into the corresponding opening (or aperture) in order to allow the projection to engage the corresponding apertures in the housings and to allow the projection to be retained by the opening. The openings in the housings may be substantially the same size as the non-ramp portion of the projections.

The insertion of the projection into the corresponding opening of the housing induces compression forces that elastically displace or deform the projection to a thickness that is equal to or less than the size of the corresponding opening to permit the projection to continue to pass into the opening of the housing. Once the ramp portion of the projection fully engages (i.e., the length of the ramp portion passes through the opening and extends beyond the outer surface of the leg of the housing), the compression forces are released, whereby the elastically displaced or deformed portions of the projection being resilient, return to the free configuration (i.e., the pre-deformed shape), whereby the ramp of the projection acts to prohibit the projection from passing back through the opening in the housing. Thus, the end of the projection engaging the housing is retained and the strap is coupled to the housing.

The flexible straps 671, 771 may further include a separation (or break or tear) mechanism 777 configured as described herein and located between the projection 778 of the first end 772 and the projection 778 of the second end 773. For example, the separation mechanism 777 may be configured to separate the first end 772 from the second end 773 of the strap 771, during deployment of the airbag cushion at a predetermined strap tension in order to allow the airbag cushion to continue deploying without delay or impediment.

It should be noted that the embodiments of the airbag modules having retention mechanisms and housings described herein are not meant as limitations. Those skilled in the art will appreciate the retention mechanisms and housings for use in airbag modules can be configured using alternative embodiments in order to provide a durable and reliable method for retaining the stored airbag cushion within the airbag module during assembly, transportation (e.g., shipment from assembly location to installation location), and installation into the vehicle. The retention mechanism or the strap may be configured to retain the airbag in the housing prior to inflation and deployment of the airbag. The retention mechanisms may further provide a repeatable and controlled release or separation force in order to release during airbag deployment without delaying or impeding deployment of the airbag cushion.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the side-curtain airbags as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for protecting an occupant of a vehicle, comprising:
   an inflatable curtain airbag configured to deploy between an occupant and an interior side of the vehicle;
   an inflator for providing inflation gas for the airbag;
   a housing configured to surround the airbag; and
   a strap configured to retain the airbag in the housing prior to inflation and deployment of the airbag;
   wherein the strap includes two ends and at least one of the ends is connected to a first side of the housing, another portion of the strap being connected to a second side of the housing opposite the first side,
   wherein the strap further includes a separation mechanism between the two ends that is configured to separate the two ends of the strap during deployment of the inflatable curtain airbag.

2. The airbag module of claim 1, wherein the housing includes a catch member with an opening through which the at least one of the ends of the strap passes;
   wherein the catch member includes an engaging portion that abuts a corresponding engaging portion located on the strap to thereby lock the strap in a position parallel to a wall of the housing.

3. The airbag module of claim 2, wherein the other of the ends is integrally connected to the housing.

4. The airbag module of claim 1, wherein each end of the strap is split into two portions each portion passing through an opening in a wall of the housing, and wherein each portion includes a projection that engages the wall of the housing to prevent the portion of the strap from being withdrawn from the opening to thereby lock the strap in position relative to the housing.

5. The airbag module of claim 1, wherein the housing includes a retaining member configured to engage an opening in the strap, and wherein following the separation of the two ends of the strap an end of the strap with the opening is retained by the retaining member.

6. The airbag module of claim 1, wherein the housing includes a retaining member configured to engage an opening in the strap, and wherein during deployment of the inflatable curtain airbag an end of the strap with the opening is retained by the retaining member.

7. The airbag module of claim 1, further comprising a plurality of straps, each strap configured to retain a portion of the airbag in the housing prior to inflation and deployment of the airbag; wherein at least one of the ends of each strap is connected to the housing.

8. The airbag module of claim 7, wherein each strap of the plurality of straps includes a separation mechanism; wherein the separation mechanism of one strap of the plurality of straps is configured to separate at a different separation force than a separation force of at least one other strap of the plurality of straps.

9. The airbag module of claim 1, wherein the housing includes a substantially C-shaped cross-section defining an opening, and the strap extends across the opening.

10. The airbag module of claim 1, wherein the separation mechanism is configured as a V-shaped notch oriented transverse to a longitudinal length of the strap, and wherein V-shaped notch extends inward from an edge of the strap a distance that is less than a width of the strap.

11. An airbag module for protecting an occupant of a vehicle, comprising:
    an inflatable curtain airbag configured to deploy between an occupant and an interior side of the vehicle;
    an inflator for providing inflation gas for the airbag;
    a housing configured to surround the airbag; and
    a strap configured to retain the airbag in the housing prior to inflation and deployment of the airbag;
    wherein at least one end of the strap is connected to the housing, and
    wherein the housing includes a pair of openings, each of the openings being located on opposite sides of the housing, and wherein the at least one end of the strap passes through one of the openings and the other end of the strap passes through the other opening, and wherein each of the ends of the straps includes a projection that engages a wall of the housing after the strap is inserted through the opening to prevent the ends of the straps from being withdrawn from the openings to thereby lock the strap in position relative to the housing.

12. A housing for use in an airbag module having an inflatable airbag cushion configured to deploy between an occupant and an interior portion of the vehicle to protect the occupant, comprising:
    a thin walled base;
    two thin walled legs extending away from the base and forming a cavity configured to receive the stored airbag cushion such that the housing substantially surrounds the airbag cushion; and
    a strap configured to retain the airbag cushion in the housing prior to inflation and deployment of the airbag;
    wherein the strap includes two ends, a first of the two ends being connected to a first of the two thin walled legs of the housing and another portion of the strap being connected to a second of the two thin walled legs,
    wherein the strap further includes a separation mechanism between the two ends that is configured to separate the two ends of the strap during deployment of the inflatable airbag cushion.

13. The housing of claim 12, further comprising a catch member with an opening through which the at least one of the two ends of the strap passes; wherein the catch member includes an engaging portion that abuts a corresponding engaging portion located on the strap to thereby lock the strap in position parallel to one of thin walls of the housing.

14. The housing of claim 13, wherein the other of the ends of the strap is integrally connected to the housing.

15. The housing of claim 12, wherein each end of the strap is split into two portions each portion passing through an opening in one of the thin walls of the housing, and wherein each portion includes a projection that engages the wall of the housing to prevent the portion of the strap from being withdrawn from the opening to thereby lock the strap in position relative to the housing.

16. The housing of claim 12, further comprising a retaining member extending from one of thin walls of the housing and configured to engage an opening in the strap, and wherein following the separation of the two ends of the strap an end of the strap with the opening is retained by the retaining member.

17. The housing of claim 12, wherein the housing includes a retaining member configured to engage an opening in the strap, and wherein during deployment of the inflatable curtain airbag an end of the strap with the opening is retained by the retaining member.

18. The housing of claim 12, wherein the two thin walled legs include spaced apart ends, and the strap extends across an opening of the housing defined between the ends of the thin walled legs.

19. The housing of claim 12, wherein the separation mechanism is configured as a V-shaped notch oriented transverse to a longitudinal length of the strap, and wherein the V-shaped notch extends inward from an edge of the strap a distance that is less than a width of the strap.

20. A housing for use in an airbag module having an inflatable airbag cushion configured to deploy between an occupant and an interior portion of the vehicle to protect the occupant, comprising:
   a thin walled base;
   two thin walled legs extending away from the base and forming a cavity configured to receive the stored airbag cushion such that the housing substantially surrounds the airbag cushion; and
   a strap configured to retain the airbag cushion in the housing prior to inflation and deployment of the airbag wherein at least one end of the strap is connected to the housing; and
   a pair of openings, each of the openings being located on two different thin walls of the housing, and wherein the at least one end of the strap passes through one of the openings and the other end of the strap passes through the other opening, and wherein each of the ends of the straps includes a projection that engages one of the thin walls of the housing after the strap is inserted through the opening to prevent the ends of the straps from being withdrawn from the openings to thereby lock the strap in position relative to the housing.

* * * * *